United States Patent
Lucas Barcias et al.

(10) Patent No.: US 11,187,895 B2
(45) Date of Patent: Nov. 30, 2021

(54) CONTENT GENERATION APPARATUS AND METHOD

(71) Applicant: Sony Interactive Entertainment Inc., Tokyo (JP)

(72) Inventors: Jesus Lucas Barcias, London (GB); Claire Rogers, London (GB); Douglas Ealey, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/758,515

(22) PCT Filed: Nov. 2, 2018

(86) PCT No.: PCT/GB2018/053189
§ 371 (c)(1),
(2) Date: Apr. 23, 2020

(87) PCT Pub. No.: WO2019/086893
PCT Pub. Date: May 9, 2019

(65) Prior Publication Data
US 2020/0257112 A1    Aug. 13, 2020

(30) Foreign Application Priority Data
Nov. 6, 2017   (GB) ...................... 1718339

(51) Int. Cl.
*G02B 27/00*   (2006.01)
*G02B 27/01*   (2006.01)
*G06T 19/00*   (2011.01)

(52) U.S. Cl.
CPC ..... *G02B 27/0093* (2013.01); *G02B 27/0101* (2013.01); *G02B 27/0172* (2013.01);
(Continued)

(58) Field of Classification Search
CPC ............ G02B 27/0093; G02B 27/0101; G02B 27/0172; G02B 27/01; G02B 2027/0123;
(Continued)

(56) References Cited

U.S. PATENT DOCUMENTS

2012/0127284 A1* 5/2012 Bar-Zeev ............. G06T 19/006
348/53
2012/0249416 A1* 10/2012 Maciocci ............... G06T 17/05
345/156
(Continued)

FOREIGN PATENT DOCUMENTS

EP   3206122 A1   8/2017
EP   3707580 A1   9/2020
(Continued)

OTHER PUBLICATIONS

International Search Report and Written Opinion for corresponding PCT Application No. PCT/GB2018/053189 12 pages, dated Feb. 12, 2019.
(Continued)

*Primary Examiner* — Brent D Castiaux
(74) *Attorney, Agent, or Firm* — Matthew B. Dernier, Esq.

(57) ABSTRACT

A content generation system including an image generation unit operable to generate one or more images of a virtual environment for display at a first display device, and an image transmission unit operable to transmit generated images of the virtual environment to each of the first display device and the second display device, where the or each
(Continued)

image displayed at one of the first display device and the second display device is a subset of the or each image displayed at the other of the first display device and the second display device, and where the viewpoint of the display device displaying a subset of the or each image is operable to modify the displayed field of view independently of the field of view displayed at the other display device.

14 Claims, 13 Drawing Sheets

(52) U.S. Cl.
CPC .... *G06T 19/006* (2013.01); *G02B 2027/0123* (2013.01); *G02B 2027/0134* (2013.01); *G02B 2027/0147* (2013.01); *G02B 2027/0187* (2013.01)

(58) Field of Classification Search
CPC .... G02B 2027/0134; G02B 2027/0147; G02B 2027/0187; G06T 19/006; G06T 19/003; G06F 3/011; H04N 21/4402; H04N 13/117; H04N 13/30
See application file for complete search history.

(56) References Cited

U.S. PATENT DOCUMENTS

| | | | |
|---|---|---|---|
| 2017/0075418 A1* | 3/2017 | Zhou | G09G 5/003 |
| 2017/0206050 A1 | 7/2017 | Liu | |
| 2017/0286993 A1* | 10/2017 | Khalid | G06T 19/006 |
| 2020/0257112 A1 | 8/2020 | Lucas Barcias | |

FOREIGN PATENT DOCUMENTS

| | | |
|---|---|---|
| WO | 2016014871 A1 | 1/2016 |
| WO | 2019086893 A1 | 5/2019 |

OTHER PUBLICATIONS

Combined Search and Examination Report for corresponding GB Application No. GB 1718339.3, 5 pages, dated Apr. 30, 2018.
Examination Report for corresponding GB Application No. 1718339. 3, 3 pages, dated Aug. 18, 2021.
Communication Pursuant to Article 94(3) for corresponding EP Application No. 18800301.6, 4 pages, dated Jul. 26, 2021.

* cited by examiner

CONTENT GENERATION APPARATUS AND METHOD

BACKGROUND OF THE INVENTION

Field of the Invention

This disclosure relates to a content generation apparatus and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years, the use of head-mountable display devices (HMDs) has become more common in the home for the provision of immersive video content. This content may be three-dimensional video content or game content, for example. Immersive content is often considered to be desirable for a user as it allows them to feel more invested in the content, increasing the enjoyment of the user experience. An example of this is a virtual reality (VR) experience, in which the object is for the user to believe that they are present within the virtual environment that is presented to them.

One problem that is associated with the use of HMDs is that the experience is generally limited to a single user. In order to provide an immersive VR experience, it is desirable to generate very high quality images and perform tracking of user motion with a reduced latency. In view of these desires, it is common to leverage as much processing power as is available to a device generating images for display; in many cases, the available processing power is not sufficient for generating content to enable two or more users to each enjoy a respective VR experience of a suitable quality.

A large amount of processing power may be required in order to provide an immersive experience, and as a result it is not possible to provide a 'lower quality' immersive experience to two players using a single device to generate two streams. This is because a high frame rate and high image quality are both necessary for an immersive experience; if an un-responsive and non-smooth viewing experience (high latency/low frame rate), or a low image quality video output, is provided then the sense of immersion may be entirely lost by a user.

As a result, only a single user is often able to participate in a VR experience at a time, which may be undesirable when playing games in a group setting. One method that has been used in order to mitigate this problem is to show the same content as that provided to the HMD on a separate screen—for example, the left- or right-eye image generated for display by the HMD may also be output to a television or other display associated with the processing device. This may allow other people to also experience the view provided to the HMD user, although the experience may not be as enjoyable for the viewers of this content. One reason for this is that the use of a display other than an HMD may mean the sense of immersion expected of the content is lost; in addition to this, the viewpoint experienced by the spectators is determined entirely by the HMD user which may mean that spectators miss out on elements in the virtual environment that they wish to view.

It is in the context of these problems that the present invention arises.

SUMMARY OF THE INVENTION

Various aspects and features of the present disclosure are defined in the appended claims and within the text of the accompanying description and include at least a content generation system and a method of operating a content generation system as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

While the present disclosure refers generally to the use of an HMD as the primary display device, this is not essential.

For example, the advantages of the arrangement described in the present disclosure may be appreciated when using a 3D television or the like as the primary display device. While the problems described above may not be quite so severe in such an embodiment, the provision of second video content as described below may still provide a more immersive experience for secondary viewers.

In some embodiments, the display is a head-mountable display and the position and/or orientation of the viewer's head is detected by detecting a position and/or orientation of the head-mountable display. The head mountable display may have a frame to be mounted onto an viewer's head, the frame defining one or two eye display positions which, in use, are positioned in front of a respective eye of the viewer and a respective display element is mounted with respect to each of the eye display positions, the display element providing a virtual image of a video display of a video signal from a video signal source to that eye of the viewer. In other examples, the display is not a head-mountable display. In some embodiments, the display (whether head mountable or not) may be referred to as an immersive display, in that in normal use it fills at least a threshold angular range (for example, at least 40o) of the field of view of the user. Examples include multiple projector displays, wrap-around (curved) displays and the like.

Figure 1:
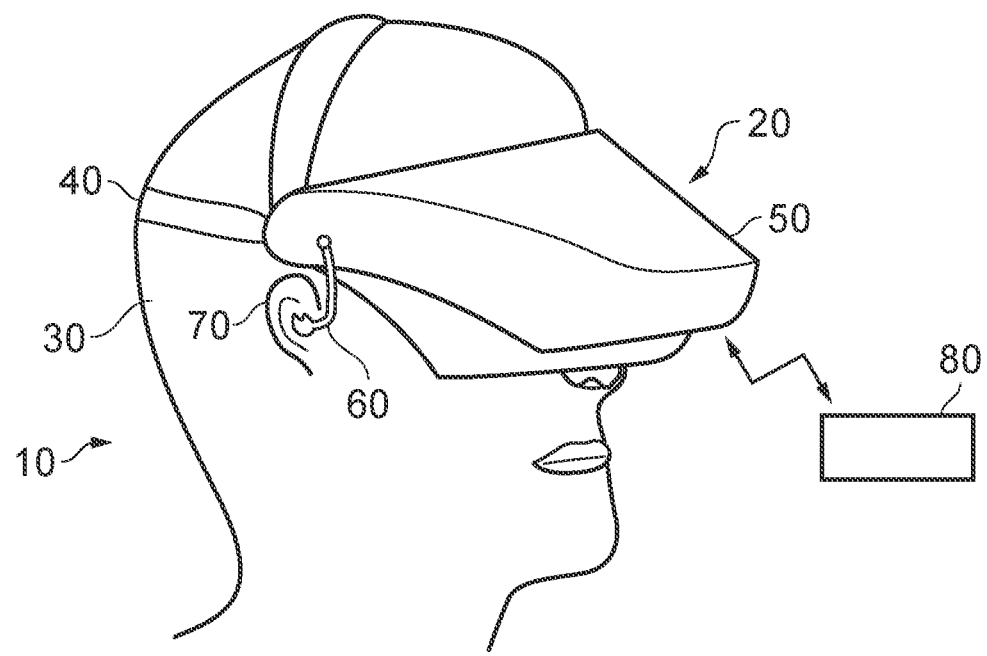
FIG. 1 schematically illustrates an HMD worn by a user.

Referring now to the drawings, wherein like reference numerals designate identical or corresponding parts throughout the several views, in FIG. 1 a user 10 is wearing an HMD 20 on the user's head 30. The HMD comprises a frame 40, in this example formed of a rear strap and a top strap, and a display portion 50.

The HMD of FIG. 1 completely obscures the user's view of the surrounding environment. All that the user can see is the pair of images displayed within the HMD.

The HMD has associated headphone earpieces 60 which fit into the user's left and right ears 70. The earpieces 60 replay an audio signal provided from an external source, which may be the same as the video signal source which provides the video signal for display to the user's eyes.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
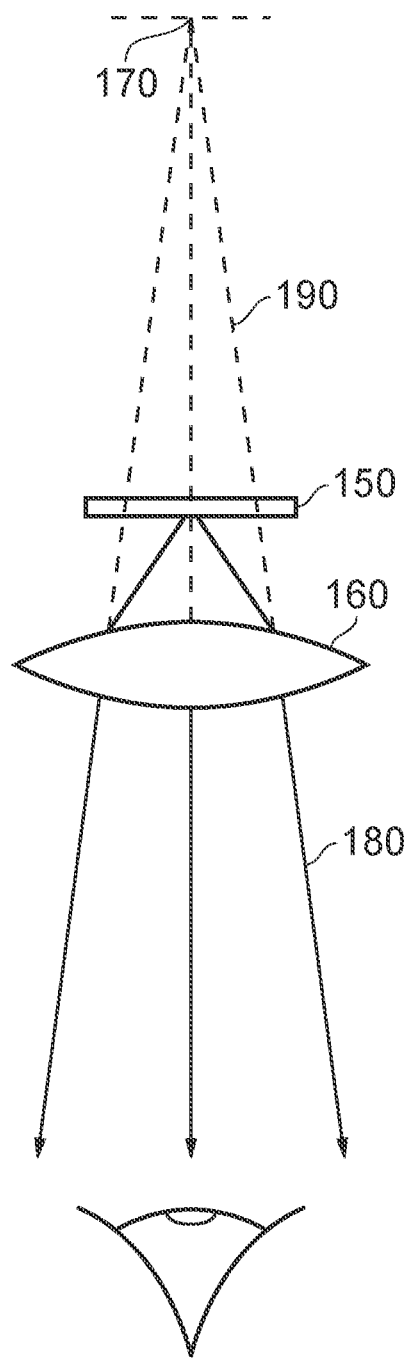
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
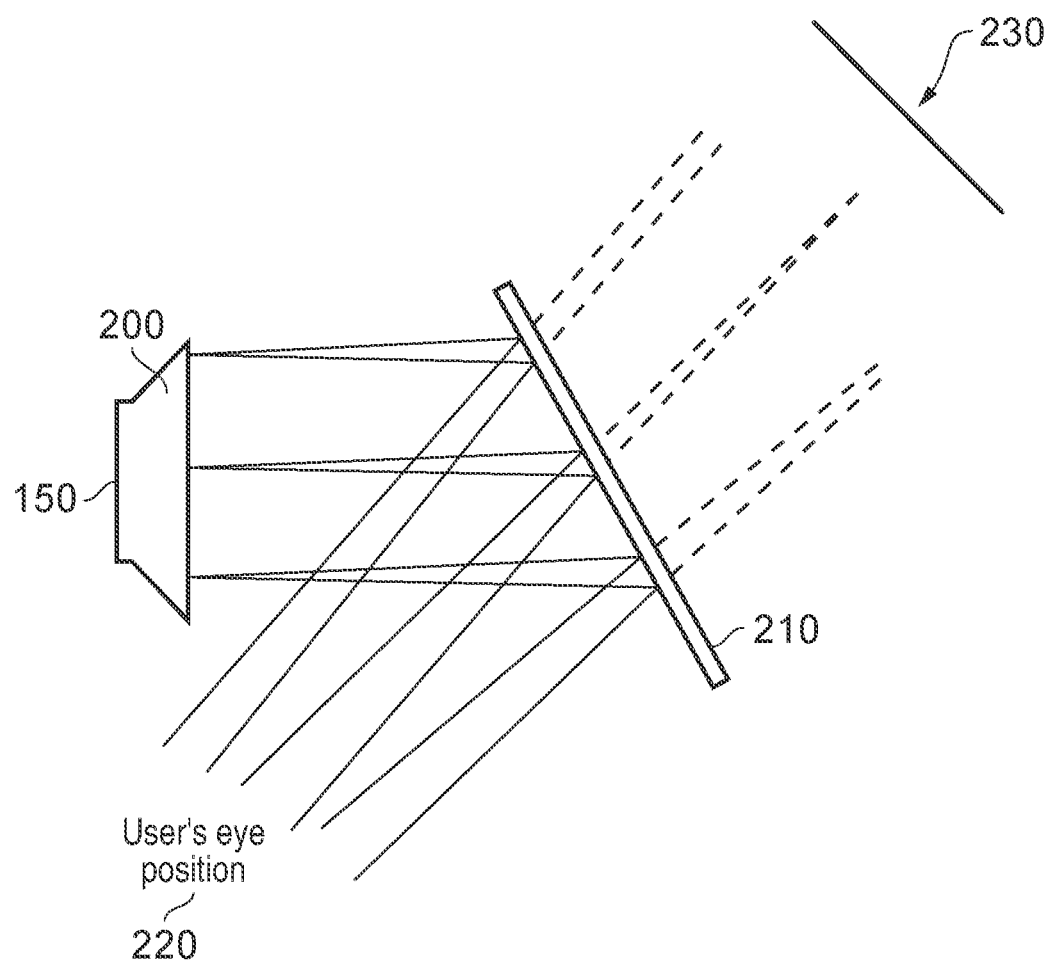
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 (and those in FIG. 15 to be described below) could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint need to track movements with respect to a real or virtual space in which the user is located.

This tracking is carried out by detecting motion of the HMD and varying the apparent viewpoint of the displayed images so that the apparent viewpoint tracks the motion.

Figure 6:
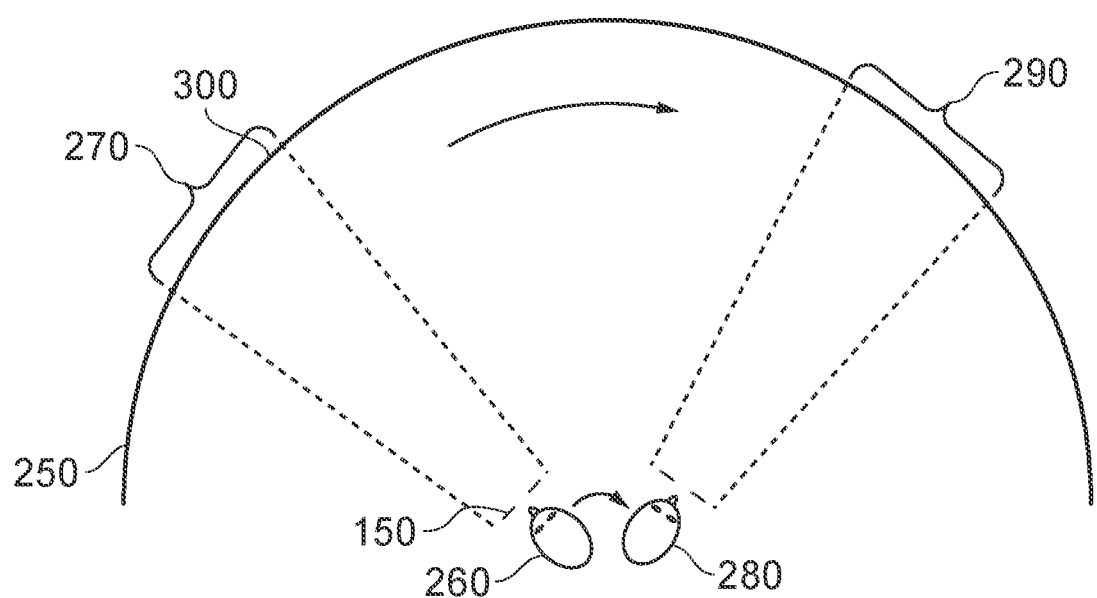
FIG. 6 schematically illustrates a change of view of user of an HMD.

FIG. 6 schematically illustrates the effect of a user head movement in a VR or AR system.

Referring to FIG. 6, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 6, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment. Similar considerations apply to the up-down component of any motion.

Figure 2:
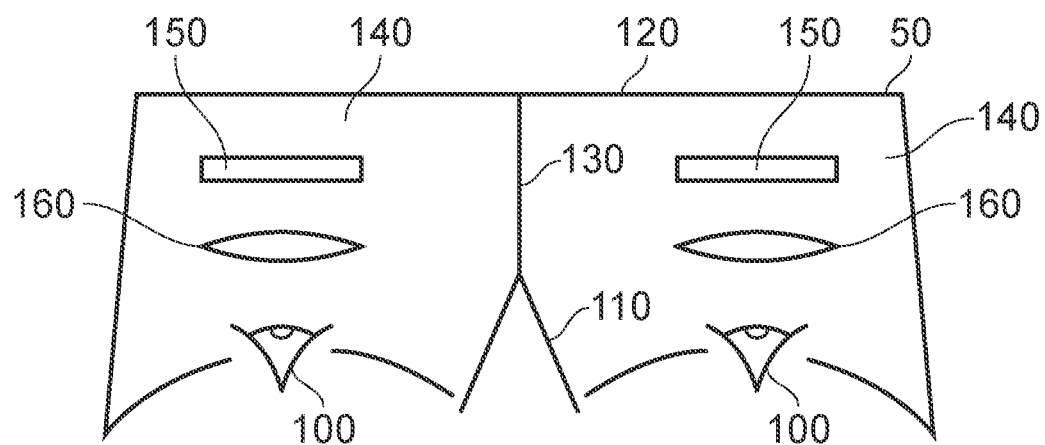
FIG. 2 is a schematic plan view of an HMD.
Figure 7A:
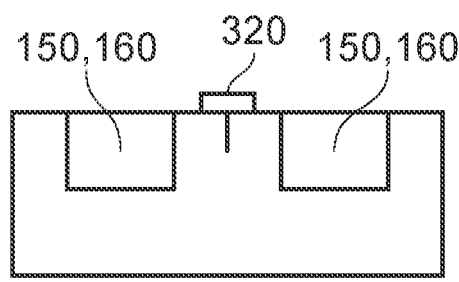
FIGS. 7a and 7b schematically illustrate HMDs with motion sensing.
Figure 7B:
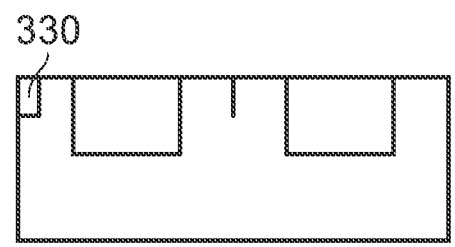

FIGS. 7a and 7b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 7a, a forward-facing camera 320 is provided on the front of the HMD. This does not necessarily provide images for display to the user (although it could do so in an augmented reality arrangement). Instead, its primary purpose in the present embodiments is to allow motion sensing. A technique for using images captured by the camera 320 for motion sensing will be described below in connection with FIG. 8. In these arrangements, the motion detector comprises a camera mounted so as to move with the frame; and an image comparator operable to compare successive images captured by the camera so as to detect inter-image motion.

FIG. 7b makes use of a hardware motion detector 330. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 8:
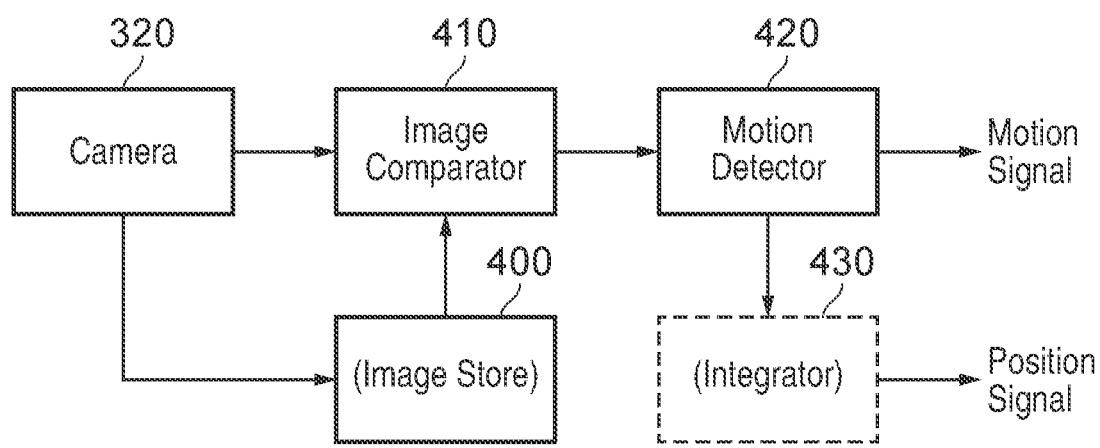
FIG. 8 schematically illustrates a position sensor based on optical flow detection.

FIG. 8 schematically illustrates one example of motion detection using the camera 320 of FIG. 7a.

The camera 320 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image captured by the camera 320 has moved since the time at which the preceding image was captured. Localised motion might indicate moving objects within the field of view of the camera 320, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 330 such as an accelerometer. This can in fact give a faster response in respect of the indication of motion, given that the response time of the video-based system is at best the reciprocal of the image capture rate. In some instances, therefore, the detector 330 can be better suited for use with higher frequency motion detection. However, in other instances, for example if a high image rate camera is used (such as a 200 Hz capture rate camera), a camera-based system may be more appropriate.

In terms of FIG. 8, the detector 330 could take the place of the camera 320, the image store 400 and the comparator 410, so as to provide an input directly to the motion detector 420. Or the detector 330 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 9:
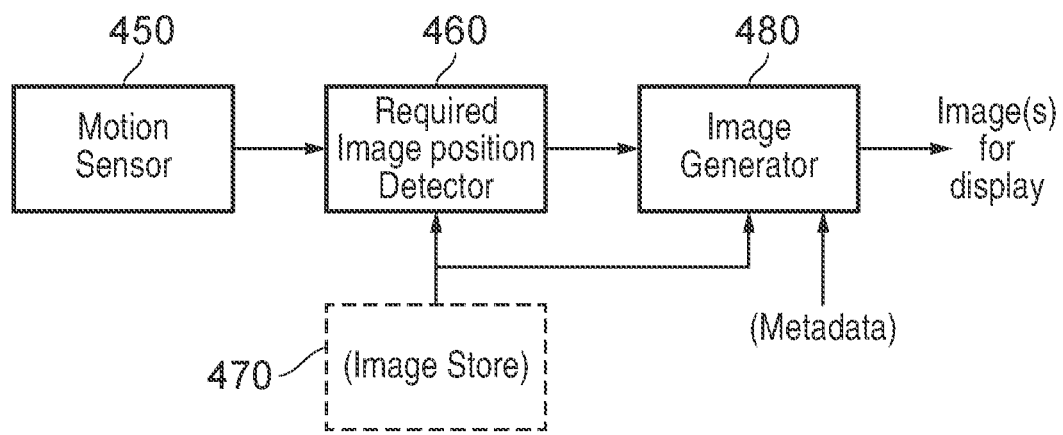
FIG. 9 schematically illustrates the generation of images in response to HMD position or motion detection.

FIG. 9 schematically illustrates image processing carried out in response to a detected position or change in position of the HMD.

As mentioned above in connection with FIG. 6, in some applications such as virtual reality and augmented reality arrangements, the apparent viewpoint of the video being displayed to the user of the HMD is changed in response to a change in actual position or orientation of the user's head.

With reference to FIG. 9, this is achieved by a motion sensor 450 (such as the arrangement of FIG. 8 and/or the motion detector 330 of FIG. 7*b*) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

The image generator 480 may act on the basis of metadata such as so-called view matrix data, in a manner to be described below.

Figure 10:
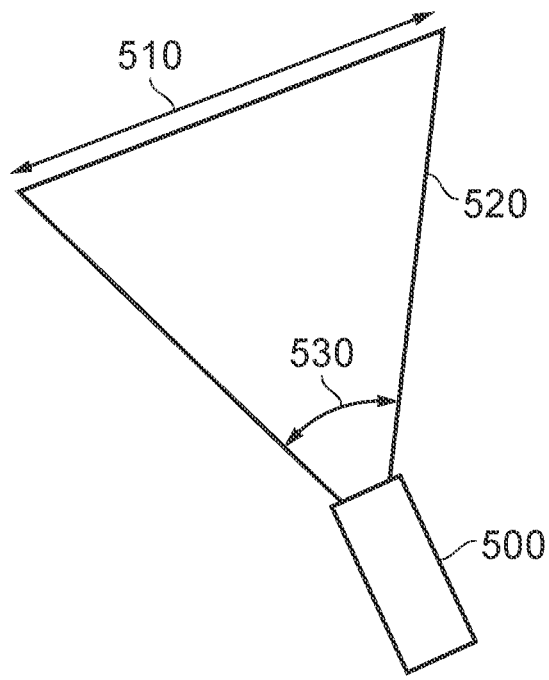
FIG. 10 schematically illustrates a virtual camera and viewpoint.

FIG. 10 schematically illustrates a virtual camera 500 that may be used to define a viewpoint in a virtual environment. The position and orientation of the virtual camera 500 may be defined in dependence upon a detected position and orientation of an HMD worn by a viewer, by a user input via a controller, or any other suitable method.

The virtual camera 500 may define a viewing area 520 with a viewing angle 530 and a viewing extent 510, the viewing extent 510 representing the depth to which the viewpoint extends. While shown in two dimensions, it would be apparent that such a viewing area 520 may be extended to a volume so as to define a three-dimensional view.

Images for display may be generated in dependence upon the position and orientation of the virtual camera 500, such that any elements in the virtual environment that appear within the defined view area/volume are displayed to a viewer.

Figure 11:
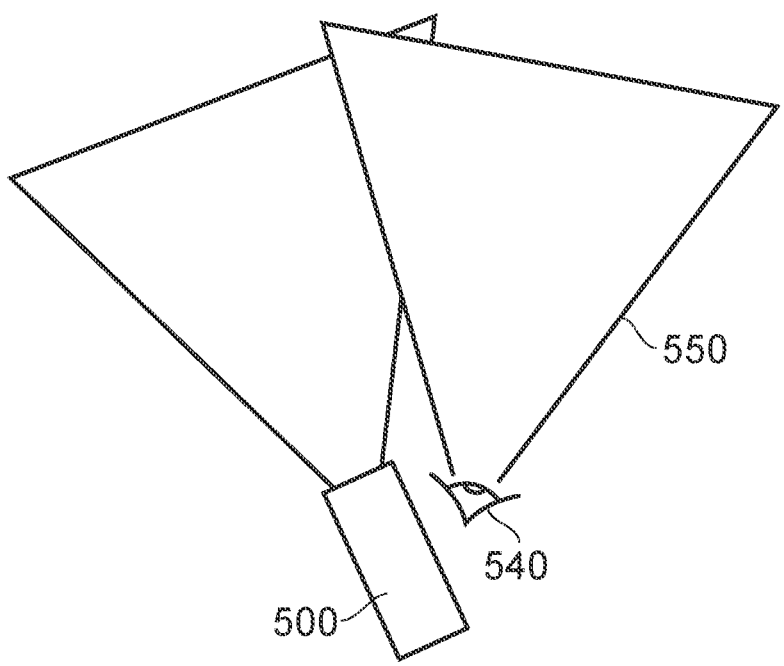
FIG. 11 schematically illustrates a change in desired viewpoint.

FIG. 11 schematically illustrates a change in the desired viewpoint of a user.

A difference in location of the virtual camera 500 and a viewer's eye 540 may arise when there is a non-negligible latency in the tracking or rendering processes, for example, and the viewer moves their head. Such a movement may be any rotation or translation.

The user, instead of viewing an area 550 as expected, may still be presented with a view of the area 520 in FIG. 10. This may cause a viewer to lose a sense of immersion, as their view in the virtual environment does not match that which would be expected. As a result, a satisfactory VR experience may not be provided to the viewer.

Problems such as this may be magnified when providing multiple users with their own VR experience using the same hardware; the sharing of the processing power results in an increased rendering and/or tracking latency. As discussed above, this often results in VR experiences being limited to a single user only.

Figure 12:
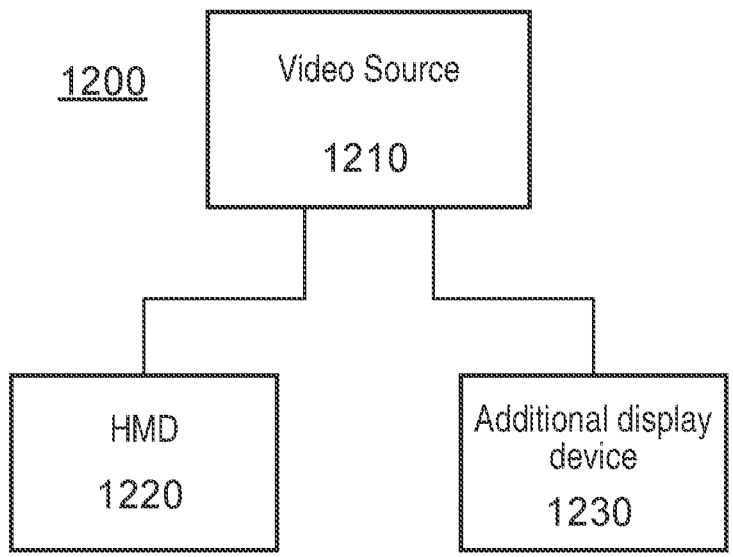
FIG. 12 schematically illustrates a content generation and display system.

FIG. 12 schematically illustrates a content generation and display system 1200 comprising a video source 1210, an HMD 1220 (which functions as a first display device), and an additional (second) display device 1230.

The video source 1210 may be any device that is operable to output video content to one or more display devices. The video source 1210 may also be able to generate the content, although in some embodiments the content may be generated by an alternative device and supplied to the video source 1210 for output to display devices. In some embodiments, the video source 1210 may be a Sony® Playstation® 4; this is a device that is operable to output video and or game content to two or more display devices. As is shown in FIG. 12, the video source 1210 is operable to output video to both an HMD 1220 and an additional display device 1230.

The HMD 1220 may be an HMD in accordance with that discussed with reference to FIGS. 1 and 2. Such a device is operable to receive video content from the video source 1210, for example via a wired or wireless data connection, and display this content to a user.

The additional display device 1230 may be any suitable device that is operable to display video content to a user. For example, the additional display device 1230 may be a second HMD (which may or may not be the same as the HMD 1220), a mobile device, a television (for example, with shutter lenses or polarising glasses for the display of stereoscopic content), or a handheld games console. The viewpoint of the user within the video content may be dependent upon user inputs using either the device 1230 or a controller associated with either the device 1230 or the video source 1210.

For example, the additional display device 1230 may comprise position and/or orientation detectors (such as gyroscopes or accelerometers) that are operable to detect the position/orientation of the device 1230. This may allow the user to control the viewpoint within the video content by moving the device 1230; in embodiments in which the device 1230 is an HMD, the control may be performed based on head motion of the user.

Alternatively, or in addition, if the device 1230 is a handheld console or mobile device (for example) then buttons or the like may be provided that are operable to modify the viewpoint within the content or otherwise control the video content playback (such as pausing the content, or taking a screenshot or the like). Similarly, such control may be provided in other embodiments. For example, a handheld controller may be provided in conjunction with and HMD so as to allow user inputs to control the content in conjunction with (or instead of) motion-based inputs.

In addition to controlling the playback of the video content, such inputs may also be used to interact with content. For example, if the video content relates to a game then the viewer of the additional display device 1230 may be able to provide inputs to control the game; this may include controlling a character's actions, modifying a virtual environment, or otherwise influence the interactive experience of the user of the HMD 1220.

The additional display device 1230 may be operable to display images using a different aspect ratio to that of images displayed by the HMD 1220.

Figure 13:
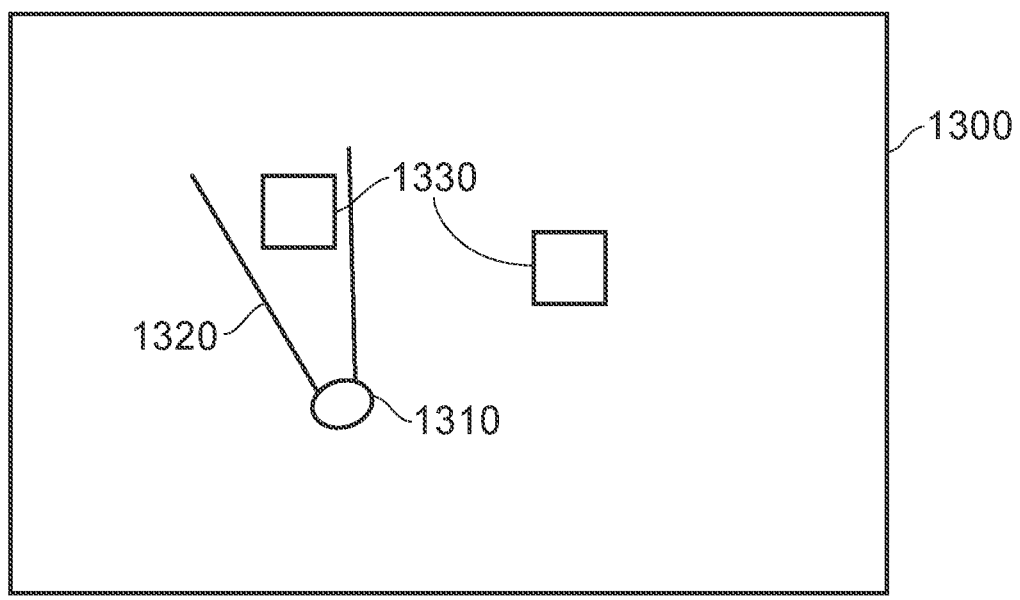
FIG. 13 schematically illustrates a plan view of a virtual environment.

FIG. 13 schematically illustrates a plan view of a virtual environment 1300 comprising a user viewpoint 1310 with a corresponding view area 1320. The virtual environment 1300 also comprises objects 1330.

The user viewpoint 1310 represents the position in the virtual environment 1300 from which a viewpoint is generated for display to that user. As discussed above, this may be influenced by user inputs and/or a user's real-world position and/or orientation.

The view area 1320 associated with the user viewpoint 1310 is determined in a similar manner, and is used to illustrate which features (such as one of the objects 1330) are included within the field of view that is presented to a viewer.

Figure 14:
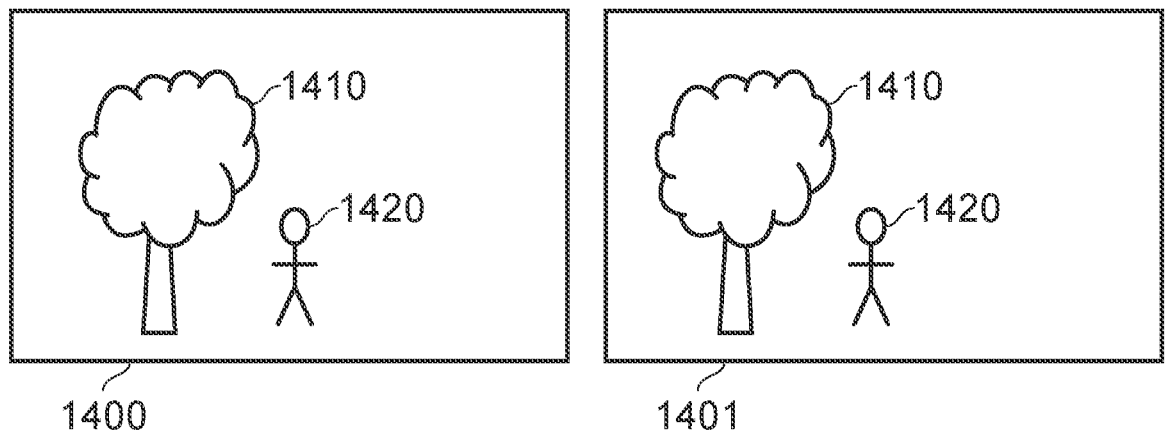
FIG. 14 schematically illustrates a stereoscopic image pair.

FIG. 14 schematically illustrates a stereoscopic image pair comprising a left image 1400 and a right image 1401. The images depict a virtual environment, comprising an object 1410 and a character 1420 (corresponding to the objects 1330 in FIG. 13, for example), with a disparity that means that when the images are displayed to a viewer in an appropriate manner a three-dimensional effect is provided. For example, an HMD may provide an arrangement in which the viewer's left eye is only able to see the left image and the viewer's right eye is only able to see the right image.

In general, the images 1400 and 1401 are to be provided to an HMD (such as the HMD 1220 of FIG. 12) to be displayed in their entirety, with a new image being generated in response to user head motion (or other user input) so as to ensure that the displayed view matches the user's expected or desired view.

Whilst it would be expected that the HMD 1220 would display the images 1400 and 1401 in their entirety, the displays associated with the additional display device 1230 may not be the same size or shape. As a result of this, a selection of a particular region of each of the images 1400 and 1401 may be performed so as to generate appropriate images for display at the additional display device 1230.

Figure 15:
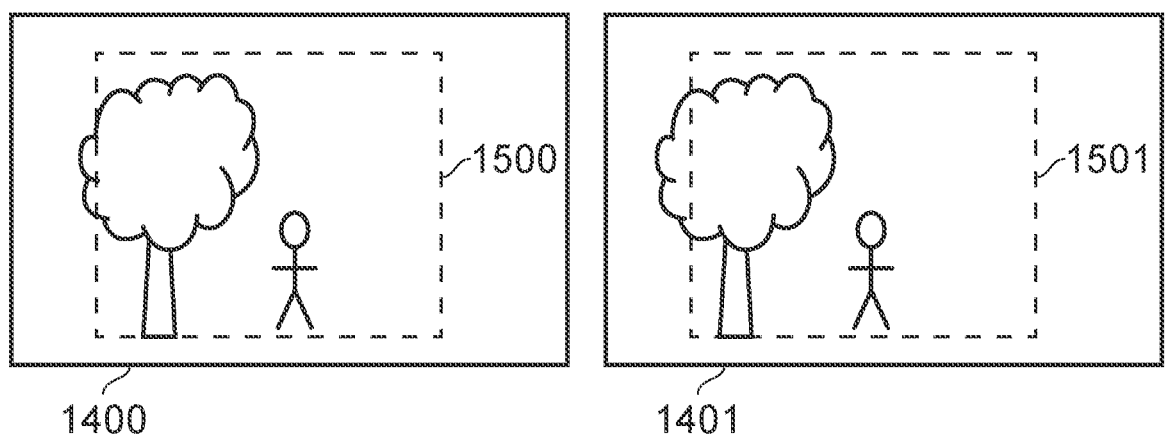
FIG. 15 schematically illustrates a stereoscopic image pair with selected image portions.

FIG. 15 schematically illustrates an embodiment in which respective portions 1500 and 1501 of the generated images 1400 and 1401 are selected for display. In some embodiments, this is performed so as to indicate which portions of the generated images 1400 and 1401 are to be displayed by an additional display device 1230. The additional display device 1230 may be operable to select image portions 1500 and 1501 for display in dependence upon a viewer input and/or motion tracking of the viewer, for example.

The display of only a portion of generated images 1400/1401 may be advantageous in that a user is able to pan about an image freely without requiring additional images to be generated to represent the image content that was outside of the initially-displayed image. For example, a user may wish to see the whole of the tree 1410 in the image 1401, and as a result move the selected portion 1501 to the left. This image content already exists, and so a portion of the image 1401 to the left of the area 1501 may be displayed without generating new image content. A delay in providing the correct image content for displaying a particular view may therefore be reduced, as it may not be necessary to generate new image content in response to a request for an updated viewpoint.

In some embodiments, the selected areas 1500 and 1501 have the same aspect ratio as the initially generated images 1400 and 1401 (commonly 16:9, but not limited to this). This may be the case if the display or displays associated with the additional display device 1230 are of the same aspect ratio as those of the HMD 1220, for example. The selected areas 1500 and 1501 may be enlarged for display by the additional display device 1230 if the displays are of a greater resolution than the selected areas 1500 and 1501, or may be displayed without adjustment if the displays are of the same or similar resolution to that of the selected areas 1500 and 1501.

In other embodiments, the selected areas 1500 and 1501 are of a different aspect ratio to that of the initially generated images 1400 and 1401. This may be advantageous in the case that the aspect ratio of the additional display device 1230 differs from that of the HMD, for example. In an embodiment in which the additional display device 1230 is a mobile phone, a single high definition display (such as a 1920×1080 pixel resolution) may be provided that is required to show both images; this results in two separate areas each with 960×1080 pixels. This is effectively an aspect ratio of 8:9, rather than the 16:9 of the full screen and the generated image (although the generated image may be any other suitable aspect ratio, of course).

In such a case, it may be advantageous to select a different aspect ratio for the selected images 1500 and 1501 to those of the initial images 1400 and 1401, and then perform any scaling or the like as required.

The selected areas 1500 and 1501 may be additionally or alternatively selected to reduce apparent motion in the displayed scene; if the images correspond to those presented to the user of the primary HMD, then these images are likely to track micro-motions of that user's head, and other small motions associated with their breathing, arm movements etc.

These could be disorientating or cause discomfort for a secondary user, as their display appears to react to background minor head movements that are not their own.

Consequently, an image stabilisation technique may be used to remove small movements between frames by adjusting the position of the selected areas in a direction opposite to that of the detected movement in the supplied images. Because the selected areas 1500 and 1501 are smaller than the source images, this movement is possible within a limited range, but that range is likely to accommodate most small and involuntary movements made by the user of the primary HMD.

It will be appreciated that head motions of the user of the secondary display may then also be factored in to the selection of the areas, so that they still perceive changes in view in response to their own voluntary (or possibly involuntary) head motion, but with respect to a substantially image-stabilised view of the source images.

As an alternative to selecting the areas 1500 and 1501 at the additional display device, the selection of the areas 1500 and 1501 from the images 1400 and 1401 may be performed by the video source 1210 such that only the areas 1500 and

1501 are transmitted to the additional display device 1230. Alternatively, the areas 1500 and 1501 may be selected by the video source 1210 and identified when transmitting the images 1400 and 1401 to the additional display device 1230. As a further alternative, the images 1400 and 1401 may be transmitted to the additional display device 1230, and the additional display device 1230 performs processing to identify and then display areas 1500 and 1501.

Such an arrangement is therefore operable to provide content to a plurality of devices simultaneously, such that additional viewers may have an immersive experience corresponding to that of the user of the HMD 1220. Further modifications may further improve the spectator experience, as is described below, by providing further reductions to the processing requirements (relative to generating separate stereoscopic streams) and/or reducing the delay in providing appropriate images to a viewer.

In some embodiments, a single image of the stereoscopic image pair may be output to an additional display device 1230 if that device is not operable to display a pair of images to provide stereoscopic image content. Alternatively, the additional display device 1230 may be able to perform processing to extract and display only a single image of a supplied stereoscopic image pair.

Figure 16:
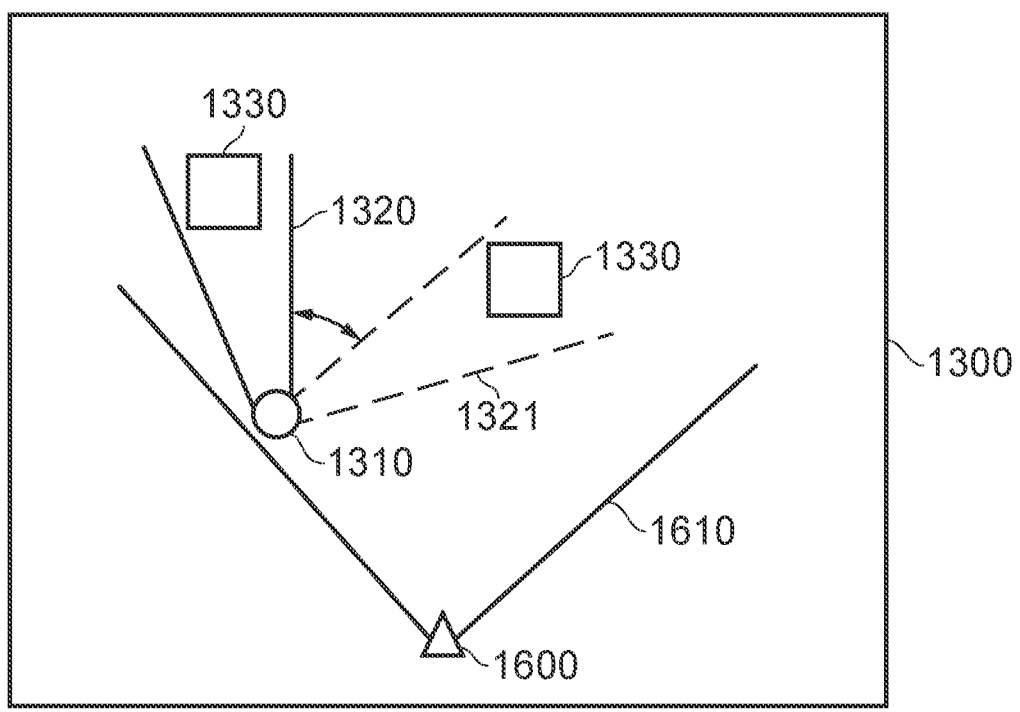
FIG. 16 schematically illustrates a plan view of a virtual environment with multiple viewpoints.

FIG. 16 schematically illustrates the virtual environment 1300 of FIG. 13 with an additional viewpoint 1600 having a corresponding view area 1610. The viewpoint 1310 has associated view areas 1320 and 1321.

The additional viewpoint 1600 corresponds to that of a user of the additional display device 1230. The location of this viewpoint may be determined in accordance with any of the above methods, or may be determined by the video source in dependence upon the content (for example). In some embodiments a view may represent a spectator of a game, a further participant in a game, or a further viewer of video content. Of course, any number of additional viewpoints 1600 may be provided in accordance with the requests of one or more spectators.

The view area 1610 corresponding to the viewpoint 1600 encompasses a much wider field of view than those view areas 1320 and 1321 associated with the viewpoint 1310. While the differences between the respective view areas are shown to be extremely large, this may be an exaggeration in some embodiments; for example, a second display device may not be able to display such a large field of view due to screen size or the like. The relative size of the view areas here are selected so as to illustrate that the view area 1610 associated with the additional viewpoint 1600 is wider than that of a view area associated with the viewpoint 1310.

The use of a wider field of view for an additional viewpoint is advantageous in that it reduces the likelihood of a user changing the requested viewpoint, as they are already able to see a large number of objects. FIG. 16 illustrates this in that only one of the objects 1330 may be viewed at a time from the position of the viewpoint 1310, whilst the view area 1610 encompasses both of the objects 1330 without the user adjusting the viewpoint further. In some embodiments the size, shape, or orientation of the view area 1610 may be determined so as to include all (or a significant proportion) of the objects of interest within a scene. For example, the view area 1610 may be defined so as to encompass all 'quest objects' in a game scene in addition to non-playable characters with which a player is likely (or at least able) to interact.

By reducing the frequency with which the user is likely to change the viewpoint, processing required to generate new viewpoints may be reduced. In addition to this, the importance of providing a smooth transition may be reduced; an equivalent change in view direction may represent a much greater change in content when the field of view is narrow than when it is wide. This is because the change in direction is much smaller relative to the size of the field of view for a wide view area; for example, a head rotation of 10 degrees represents a third of a view area of 30 degrees, but only a tenth of a view area of 100 degrees.

In view of this consideration, fewer new images may be generated by the video source 1210 for display by the additional display device 1230, for example, which may reduce the processing burden on the video source 1210 and/or additional display device 1230.

As a summary of the above examples (the embodiments described with reference to FIG. 15 or 16), it is apparent that the or each image displayed at one of the first display device and the second display device is a subset of the or each image displayed at the other of the first display device and the second display device, and that the viewpoint of the display device displaying a subset of the or each image is operable to modify the displayed field of view independently of the field of view displayed at the other display device.

Figure 17:
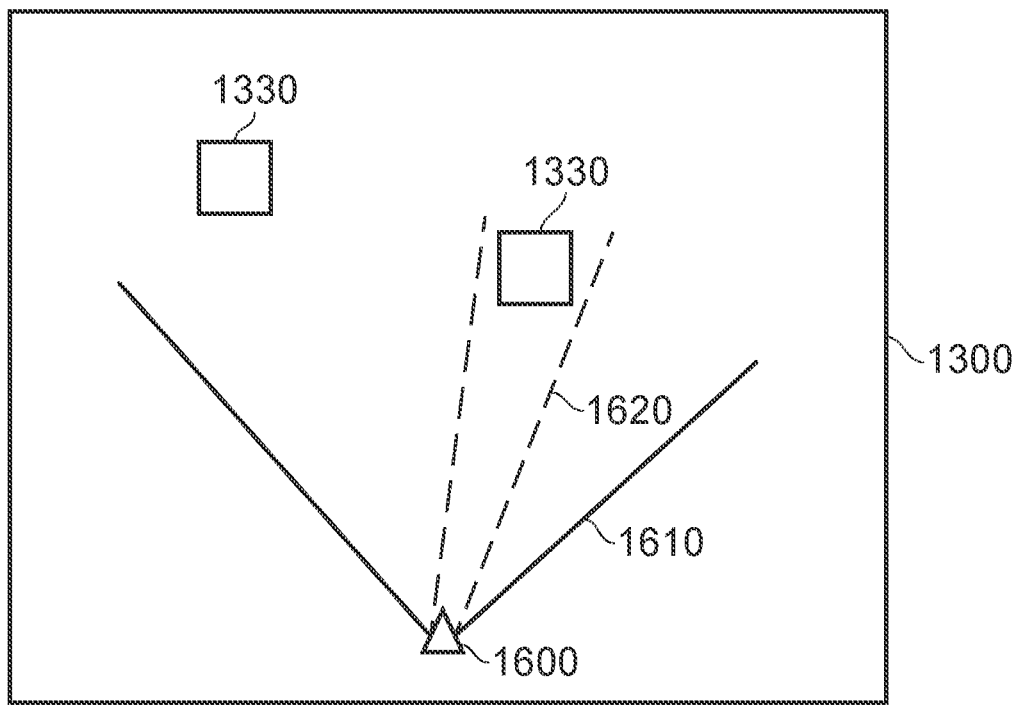
FIG. 17 schematically illustrates a plan view of a virtual environment with a viewpoint having a wide field of view.

FIG. 17 shows an embodiment in which wide field of view content is generated for supply to an additional display device 1230, but only a portion of the wide field of view content is actually displayed by the additional display device 1230 at any given time. Alternatively, an arrangement may be provided in which the wide field of view content is generated, but only a portion of the content is transmitted to the additional device in dependence upon the indicated viewpoint associated with the device.

FIG. 17 schematically illustrates a view area 1620 representing the portion of the virtual environment 1300 that is displayed to the user. The view area 1620 is present in the view area 1610 corresponding to the additional viewpoint 1600.

A reduced frame rate of supplied content may be acceptable in such an arrangement as if a user pans within the content image content already exists that may be used; therefore the likelihood of a user panning and there not being sufficient image content to display a full image is reduced. The refresh rate of the display may be selected to be sufficiently high such that the image portions are updated with a high enough frequency so as to provide responsive viewpoint changes.

Of course, the view area 1620 may still comprise a wider field of view than a corresponding view area associated with a viewpoint of an HMD user, in line with the discussion above with reference to FIG. 16. The benefits of a displayed wide field of view in reducing the likelihood of a change of viewpoint may therefore be obtained even when only displaying a portion of the generated content.

In some embodiments, the size of the view area may be defined in dependence upon the content being provided by the video source. For example, the size of the view area may be defined so as to encompass all objects of interest (such as non-playable characters and interactive objects) as these are the objects that are most likely to attract a player's attention. By providing a view that includes all of (or a substantial portion of) these objects the desire of the viewer to change view position may be reduced significantly.

Alternatively, or in addition, the viewpoint may be defined so as to comprise a main player (such as that controlled by the user of the HMD 1220 in FIG. 12). This may be particularly appropriate in arrangements in which the additional display device 1230 is used to provide a spectator view of the HMD 1220 user's gameplay.

Video content for the additional display device 1230 may be generated in any suitable manner. In some examples, game data or other content generation data may be used to render content for the additional display device 1230. Alternatively, or in addition, content generated for display by the HMD 1220 may be provided to the additional display device.

In some embodiments, an application is provided either at the video source 1210 or the additional display device 1230 that is operable to access the rendering resources used by the video source 1210 to generate content for display at the HMD 1220. This may comprise accessing the z-buffers, render lists and texture information stored by the video source 1220, for example.

Using these resources, the application is operable to generate a view for display by the additional display device 1230 by performing its own rendering process. In some embodiments, the video source 1210 is operable to maintain z-buffers, render lists and texture information (or any other type of information that may be used for rendering a virtual scene) for a greater portion of a virtual scene than is to be displayed at the HMD 1220; this is an example of a modification to the process that may ensure that a wider field of view may be generated for the spectator.

Arrangements such as those described above should not be limited to embodiments in which VR content is provided to a HMD user; the teachings here may be equally applicable to arrangements in which non-immersive two-dimensional content is provided. This may provide a more interactive and intuitive spectator experience, for example, for any number of games or other types of content.

Figure 18:
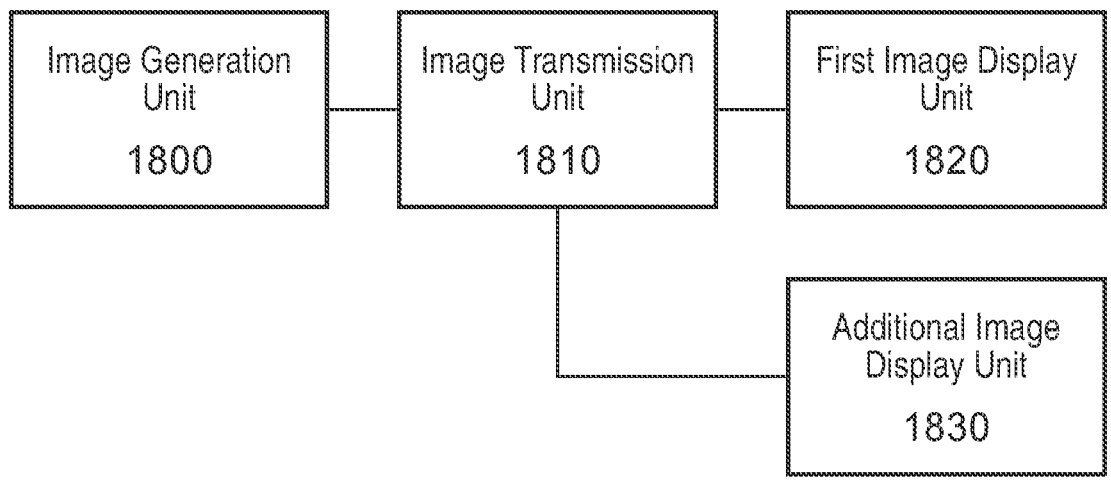
FIG. 18 schematically illustrates a content generation and display system.

FIG. 18 schematically illustrates a content generation and display system. This system comprises an image generation unit 1800, an image transmission unit 1810, a first image display unit 1820 and one or more additional display units 1830.

The image generation unit 1800 is operable to generate one or more images of a virtual environment for display at a first display device and a second display device. The image generation unit 1800 is operable to generate one or more images in dependence upon a viewpoint in the virtual environment associated with a user of the first display device (such as the HMD 1220). In some embodiments, the image generation unit 1800 is operable to generate one or more stereoscopic image pairs.

The features of the image generation unit 1800 are described in more detail below with reference to FIGS. 19 and 20.

The image transmission unit 1810 is operable to transmit generated images to each of the first display device 1820 and an additional display device 1830. In some embodiments, the image transmission unit 1810 is operable to transmit generated images to two or more additional display devices 1830. The image transmission unit 1810 may utilise any suitable wireless or wired communication method in order to transmit images, for example an HDMI cable, USB cable, WLAN connection or a Bluetooth® connection.

In embodiments in which the image generation unit 1800 is operable to generate one or more stereoscopic image pairs, the image transmission unit 1810 may be operable to transmit a single image of a generated stereoscopic image pair to the additional display device 1230.

As noted above, in some embodiments of the presently disclosed arrangement it may be possible to provide content to an additional display device 1230 with a reduced frame rate without a significant loss of immersion for a user. In such embodiments, the image transmission unit is operable to transmit fewer images to the additional display device 1230 than to the first display device (such as the HMD 1220).

The first image display unit 1820 is the primary display unit for displaying content generated by the image generation unit 1800. This may correspond to a display associated with the HMD 1220 of FIG. 12, for example, and the first image display unit 1820 may generally be associated with a user regarded as the main player of a game or the like. In some embodiments, the first display device is a head-mountable display device.

The additional image display unit(s) 1830 correspond to the additional display device 1230 of FIG. 12. The additional image display unit(s) may be display units associated with any one of a head-mountable display device, a mobile device (such as a mobile phone or portable games console), a monitor, and a television. Each additional image display unit 1830 is operable to display a portion of each received image; in the examples described above, this may correspond to displaying an image area 1500 of a received image 1400 (see FIG. 15). In some embodiments, the additional image display unit 1830 is operable to select an image portion for display in dependence upon a viewer input and/or motion tracking of the viewer.

As would be apparent from consideration of the above description, images may be generated and transmitted in the form of stereoscopic pairs (although this is not essential) such that three-dimensional images may be viewed by a viewer.

Figure 19:
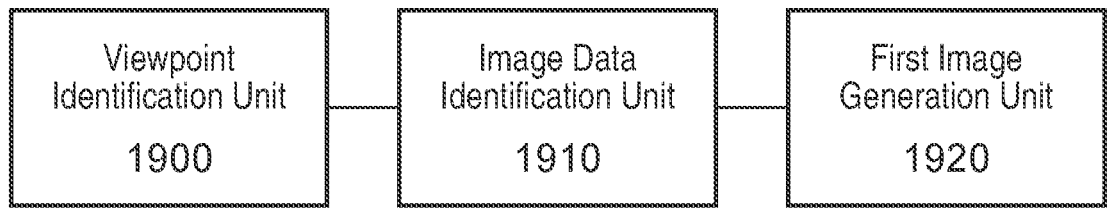
FIG. 19 schematically illustrates an image generation unit.

FIG. 19 schematically illustrates an image generation unit 1800 that comprises a viewpoint identification unit 1900, an image data identification unit 1910 and a first image generation unit 1920.

The viewpoint identification unit 1900 is operable to identify a viewpoint within the virtual environment that comprises a location, orientation and field of view (or any other suitable method for defining a viewpoint). These elements may be used to determine which portions of the virtual environment should be displayed to a viewer.

The image data identification unit 1910 is operable to identify the data required to generate an image for display according to that determined by the viewpoint identification unit 1900. For example, this may comprise locating meshes and/or textures corresponding to objects that will be visible within the generated image. This identification may also comprise locating where the image data is stored, for example in a local storage device or on a server that stores the image data.

The first image generation unit 1920 is operable to generate one or more images using the information from the viewpoint identification unit 1900 and the data identified by the image data identification unit 1910. This may comprise any suitable rendering process or processes, such as performing z-culling, light modelling (such as ray tracing), and texture mapping. The first image generation unit 1920 may be further operable to generate stereoscopic image pairs for transmission, for example by considering depth information associated with the objects in the virtual scene to generate a pair of images with the correct disparity offset from one another.

Figure 20:
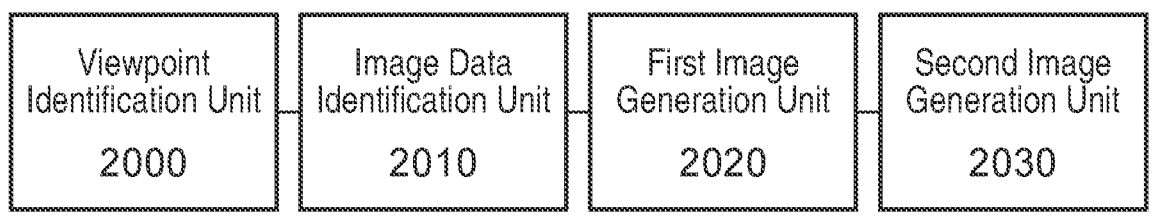
FIG. 20 schematically illustrates an image generation unit.

FIG. 20 schematically illustrates an alternative image generation unit 1800, for use when separate images are generated for the first display device and the additional display devices. This image generation unit 1800 comprises a viewpoint identification unit 2000, image data identification unit 2010, first image generation unit 2020 and second image generation unit 2030.

In some embodiments, the image generation unit shown in FIG. 20 operates in a manner according to that of FIG. 19, in which each of the units performs the function of the corresponding unit. The second image generation unit 2030 performs the additional function of generating lower-resolution versions of the images generated by the first image generation unit 2020, for example, or identifies which images may be omitted from the transmission to an additional display device. The second image generation unit 2030 may also perform image manipulations in images generated by the first image generation unit 2020, such as cropping or otherwise resizing the images. Of course, the first and second image generation units 2020 and 2030 may be formed as a single image generation unit.

In some embodiments, it is therefore apparent that the image generation units 2020 and 2030 (or the combined single image generation unit) are operable to generate low-resolution and high-resolution versions of the same images, and the image transmission unit 1810 is operable to transmit the high-resolution images to the first display device 1220 and the low-resolution images to the additional display device 1230. The resolution of the low-resolution images may be selected in dependence upon the display properties of the additional display device 1230, such that an appropriate-resolution image is provided to each additional display device 1230.

In some embodiments, it is therefore apparent that the image generation units 2020 and 2030 (or the combined single image generation unit) are operable to generate reduced-size versions of the one or more first images, and the image transmission unit 1810 is operable to transmit the reduced-size images to the additional display device 1230.

In some embodiments in which the image generation unit of FIG. 20 is used, the first image generation unit is operable to generate one or more first images of a virtual environment for display at a first display device, and the second image generation unit is operable to generate one or more second images of the virtual environment for display at a second display device, the one or more second images having a larger field of view than the one or more first images. This may allow images to be generated in accordance with the discussion relating to FIGS. 16 and 17, for example.

In such embodiments, the viewpoint identification unit 2000 is operable to identify two or more viewpoints (one for a first user, and one or more corresponding to one or more additional users). It should be noted that there need not be a one-to-one mapping between viewpoints and users, as multiple users may share the same viewpoint, for example, or additional viewpoints may be identified at which to generate image content for future playback or the like.

In some embodiments, the viewpoints associated with the one or more additional users are identified with a wider field of view by the viewpoint identification unit 2000. The breadth of the field of view may be determined either using fixed values (for example, set by a user or a content provider), or by using knowledge of the virtual scene so as to ensure a sufficient number of significant objects are to be included within a generated image, for example. Alternatively, or in addition, the breadth of the field of view may be determined in dependence upon a corresponding user's view history; for example, a user with a history of not changing view direction often may be provided with an image of a narrower field of view than that provided to a user that is prone to change view direction often.

The image data identification unit 2010 is operable to identify resources in the same manner as the image data identification unit 1910 of FIG. 19, for each of the identified viewpoints.

The first image generation unit 2020 is operable to generate images in the same manner as the first image generation unit 1920 of FIG. 19. This image generation is performed for a first viewpoint, generally that corresponding to the first image display device.

The second image generation unit 2030 is operable to generate images for a second display device. This is performed in a similar manner as the rendering performed by the first image generation unit 2020, although for a different viewpoint and generally so as to generate an image with a wider field of view (as described above).

The first and second image generation units 2020 and 2030 may instead be formed as a single unit in some embodiments. This unit may be located at the image source 1210 of FIG. 12, for example. Alternatively, the first and second image generation units 2020 and 2030 may be located at the respective display devices (for example, the HMD 1220 and additional display device 1230 of FIG. 12) in embodiments in which the data identified by the image data identification unit 2010 is transmitted to the display devices instead of generated images.

Of course, in embodiments in which more than one additional display device is used there may be a third or even greater number of image generation units. In some embodiments, an image generation unit is provided for each display device. In some embodiments, an image generation unit is provided for each desired viewpoint.

Figure 21:
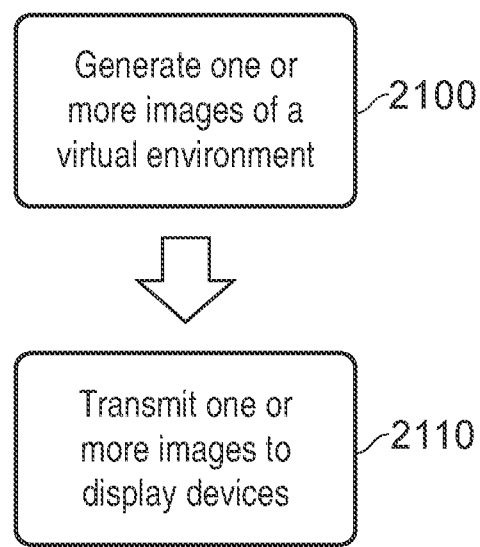
FIG. 21 schematically illustrates a content generation and transmission method.

FIG. 21 schematically illustrates a content generation and transmission method.

A step 2100 comprises generating one or more images of a virtual environment for display at a first display device. Examples of image generation methods are described with reference to FIGS. 22 and 23 below.

A step 2110 comprises transmitting generated images to each of the first display device and an additional display device. This may be performed using any suitable wired or wireless communication method.

Figure 22:
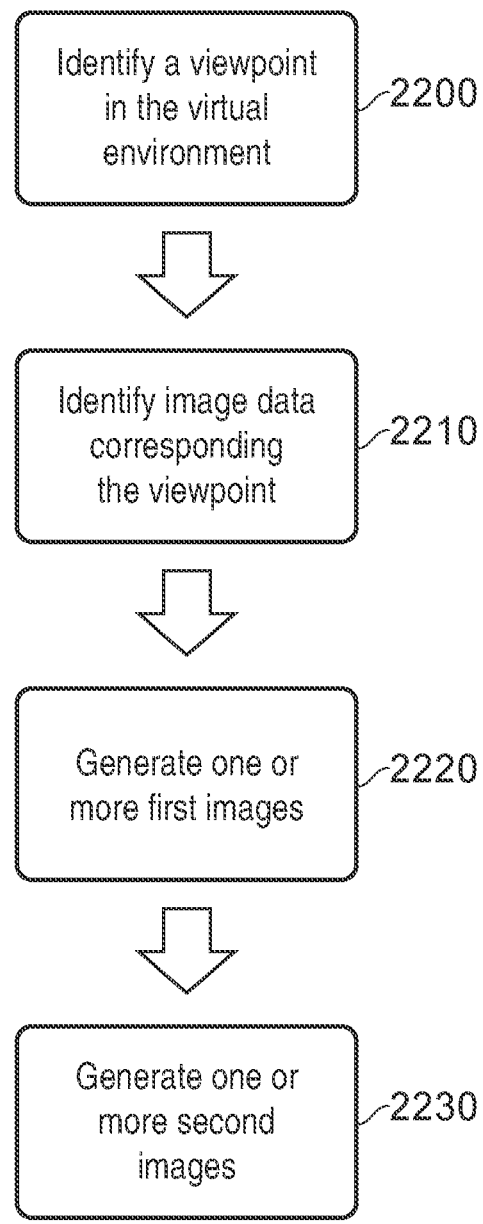
FIG. 22 schematically illustrates a content generation method.

FIG. 22 schematically illustrates an image generation method.

A step 2200 comprises identifying a viewpoint in the virtual environment. As noted above, identifying a viewpoint within the virtual environment comprises determining a location, orientation and field of view (or any other suitable method for defining a viewpoint). These elements may be used to determine which portions of the virtual environment should be displayed to a viewer.

A step 2210 comprises identifying image data corresponding to the viewpoint identified in step 2200. For example, this may comprise locating meshes and/or textures corresponding to objects that will be visible within the generated image. This identification may also comprise locating where the image data is stored, for example in a local storage device or on a server that stores the image data.

A step 2220 comprises generating one or more first images using the identified image data; as described above, this may include any suitable rendering process or processes, such as performing z-culling, light modelling (such as ray tracing), and texture mapping. In addition to this, the step 2220 may comprise generating stereoscopic image pairs rather than single images, for example by considering depth information associated with the objects in the virtual scene to generate a pair of images with the correct disparity offset from one another.

A step 2230 is an optional step that may be performed, and it comprises the generation of one or more second images using either the identified image data from step 2210 or the images generated in step 2220. In the former case, this comprises rendering an image separately from the one or more first images while in the latter case a manipulation of the one or more first images is performed as appropriate. In some embodiments, one or more second images may be generated either as low-quality/low-resolution versions of the first images, or cropped/resized versions of the same image.

Figure 23:
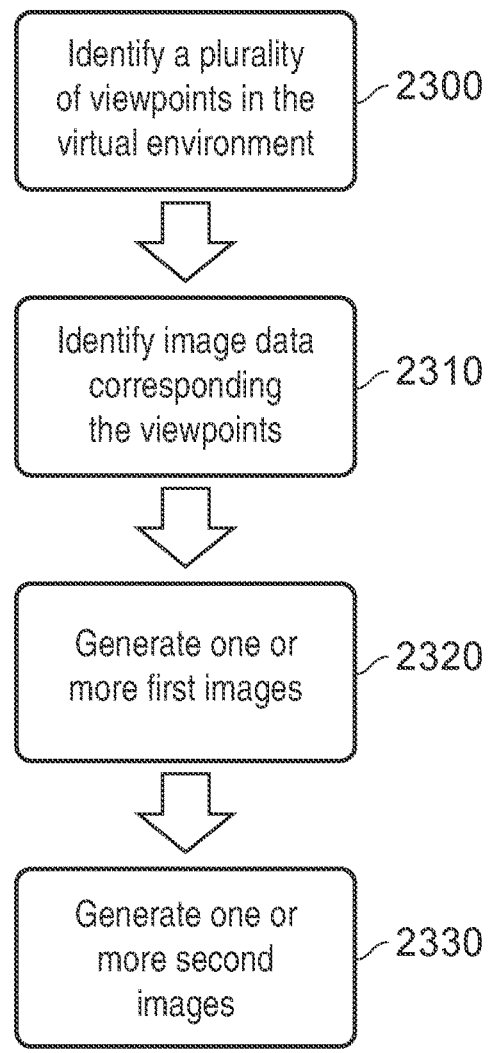
FIG. 23 schematically illustrates a content generation method.

FIG. 23 schematically illustrates an alternative image generation method to that of FIG. 22.

A step 2300 comprises identifying a plurality of viewpoints in the virtual environment; one corresponding to a first user, and one or more corresponding to one or more additional users. In some embodiments, the viewpoints associated with the one or more additional users are identified with a wider field of view.

A step 2310 comprises identifying image data corresponding to the one or more viewpoints, in the same manner as the step 2210.

A step 2320 comprises generating one or more first images for display by a first display device, in the same manner as the step 2220.

A step 2330 comprises generating one or more second images corresponding to an additional display device. This is performed in a similar manner as the rendering performed by the first image generation unit 2020, although for a different viewpoint and generally so as to generate an image with a wider field of view.

It should be understood that the step 2330 may be repeated any number of times to generate further images, such as to generate one or more third images corresponding to a third display device or viewpoint.

Figure 24:
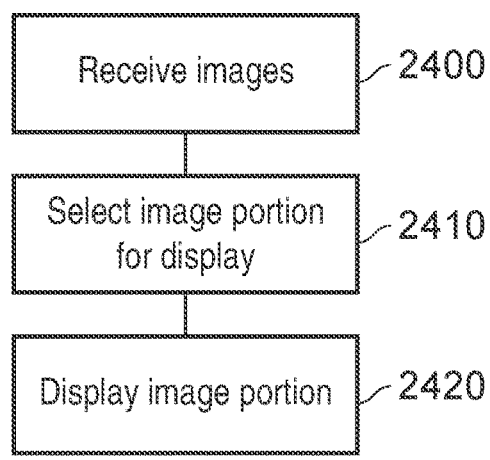
FIG. 24 schematically illustrates a content display method.

FIG. 24 schematically illustrates a content display method.

A step 2400 comprises receiving image content from an image source; for example, the one or more second images generated by the method illustrated by FIG. 22.

A step 2410 comprises selecting an image portion for display. This portion is a part of a received image, for example the image area 1500 of the image 1400 in the example of FIG. 15.

An appropriate portion for display may be determined in dependence upon a viewer input and/or motion tracking of the viewer, for example. This may be determined prior to transmission of the image content (such that only the selected image portion may be transmitted to the display device), or the display device may perform the selection after receiving the image content.

A step 2420 comprises displaying the selected image portion, as selected in the step 2410.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A content generation system comprising:
    an image generation unit operable to generate one or more images of a virtual environment for display at a first display device and a second display device; and
    an image transmission unit operable to transmit generated images of the virtual environment to each of the first display device and the second display device,
    wherein when a given image among the one or more images is displayed at one of the first display device and the second display device, a subset of the given image is displayed at the other of the first display device and the second display device, and
    wherein the viewpoint of the display device displaying the subset is operable to modify the displayed field of view independently of the field of view displayed at the other display device.

2. A content generation system according to claim 1, wherein the first display device is a head-mountable display device.

3. A content generation system according to claim 1, wherein the second display device is one of a head-mountable display device, a mobile device, a handheld games console, a monitor, and a television.

4. A content generation system according to claim 1, wherein the second display device is operable to select a viewpoint for display in dependence upon a viewer input and/or motion tracking of the viewer.

5. A content generation system according to claim 1, wherein the second display device is operable to display images using a different aspect ratio to that of images displayed by the first display device.

6. A content generation system according to claim 1, wherein the image generation unit is operable to generate the one or more images in dependence upon a viewpoint in the virtual environment associated with a user of the first display device.

7. A content generation system according to claim 1, wherein the image transmission unit is operable to transmit fewer images to the second display device than to the first display device.

8. A content generation system according to claim 1, wherein the image transmission unit is operable to transmit generated images to two or more additional display devices.

9. A content generation system according to claim 1, wherein:
    the image generation unit is operable to generate low-resolution and high-resolution versions of the same images; and
    the image transmission unit is operable to transmit the high-resolution images to the first display device and the low-resolution images to the second display device.

10. A content generation system according to claim 9, wherein the resolution of the low-resolution images is selected in dependence upon the display properties of the second display device.

11. A content generation system according to claim 1, wherein:
the image generation unit is operable to generate reduced-size versions of the one or more first images; and
the image transmission unit is operable to transmit the reduced-size images to the second display device.

12. A content generation system according to claim 1, wherein:
the image generation unit is operable to generate one or more stereoscopic image pairs; and
the image transmission unit is operable to transmit a single image of a generated stereoscopic image pair to the second display device.

13. A content generation method comprising:
generating one or more images of a virtual environment for display at a first display device and a second display device; and
transmitting generated images of the virtual environment to each of the first display device and the second display device,
wherein when a given image among the one or more images is displayed at one of the first display device and the second display device, a subset of the given image is displayed at the other of the first display device and the second display device, and
wherein the viewpoint of the display device displaying the subset is operable to modify the displayed field of view independently of the field of view displayed at the other display device.

14. A non-transitory machine-readable storage medium which stores computer software, which when executed by a computer, causes the computer to carry out actions, comprising:
generating one or more images of a virtual environment for display at a first display device and a second display device; and
transmitting generated images of the virtual environment to each of the first display device and the second display device,
wherein when a given image among the one or more images is displayed at one of the first display device and the second display device, a subset of the given image is displayed at the other of the first display device and the second display device, and
wherein the viewpoint of the display device displaying the subset is operable to modify the displayed field of view independently of the field of view displayed at the other display device.

* * * * *